F. J. WOOD.
VALVE GEAR FOR ENGINES.
APPLICATION FILED JULY 30, 1908.
1,018,688.
Patented Feb. 27, 1912.
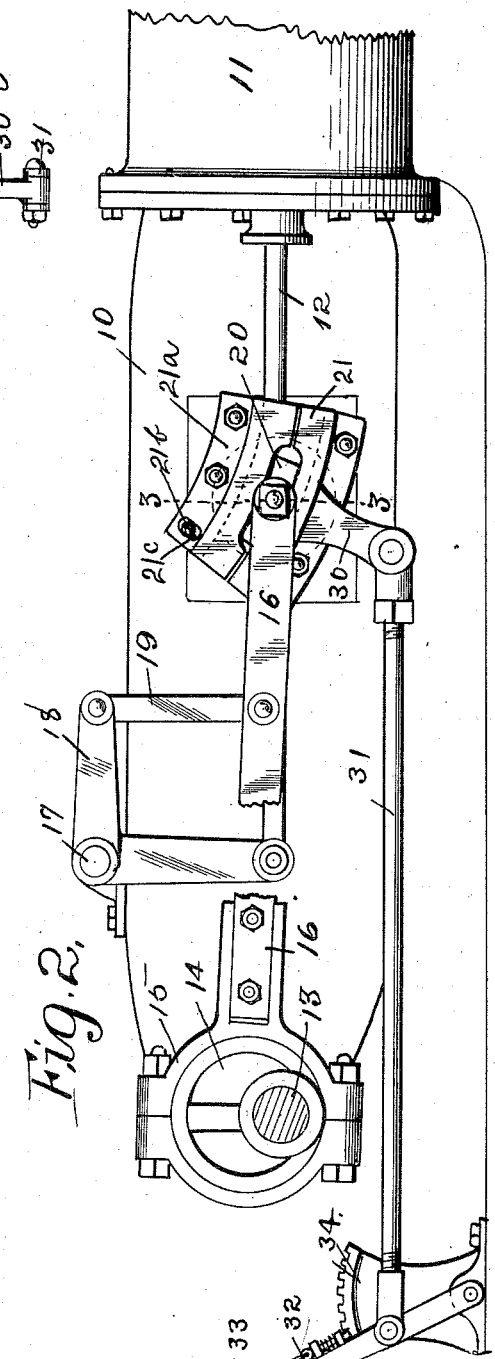
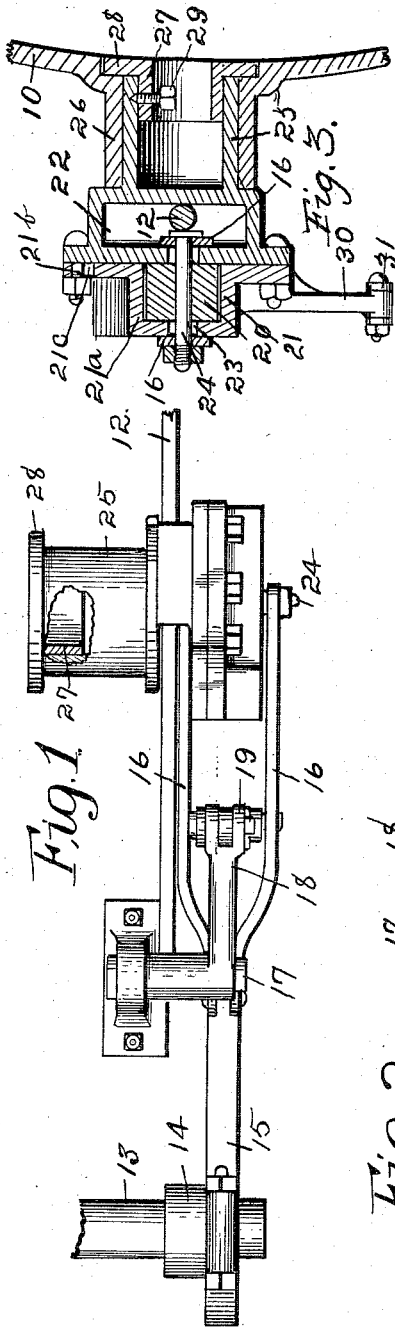
Witnesses
A. G. Hague
F. C. Caswell
Inventor
F. J. Wood
by Orwig & Lane, Att'ys

UNITED STATES PATENT OFFICE.

FRANZ J. WOOD, OF DES MOINES, IOWA.

VALVE-GEAR FOR ENGINES.

1,018,688.  Specification of Letters Patent.  Patented Feb. 27, 1912.

Application filed July 30, 1908. Serial No. 446,093.

*To all whom it may concern:*

Be it known that I, FRANZ J. WOOD, a citizen of the United States, residing at Des Moines, in the county of Polk and State of Iowa, have invented a certain new and useful Valve-Gear for Engines, of which the following is a specification.

The object of my invention is to provide a valve gear for steam engines, of simple, durable and inexpensive construction, and so arranged that, by manipulating a single lever, the valve may be arranged to cut off at any desired point of the piston stroke and to have an absolutely equal cut off at both ends of the stroke, no matter at what point of the valve movement the cut off is made to take place, and no matter in which direction the engine is running.

A further object is to provide a valve gear of this kind in which the valve will have the same amount of lead when the adjusting lever is set in any position, that is to say, when the valve is set to cut off at one part of its stroke, the valve will have the same amount of lead when the valve opens the port as it will when the valve is set to cut off at any other point of its stroke, and this will be true whether the valve is set to position for running the engine in either direction.

A further object is to provide a valve gear of this class, in which the reciprocating movement of the connecting arm will not affect the adjusting lever and in which said lever will not be vibrated by the motion of the eccentric arm as applied to the means for moving the valve, to the end that the operator may control the movement of the engine to start, stop or reverse with the greatest accuracy and with a comparatively slight amount of effort.

Another object is to provide a valve gear of this kind that will not quickly become worn to such an extent that it will cause the engine to pound by reason of lost motion in the valve gearing, the parts of the valve gearing being assembled and arranged with a view to having said parts so shaped and connected that the wear to which they are necessarily subjected may be quickly and easily taken up without affecting the adjustment or alinement of the valve gearing.

My invention consists in the construction, arrangement and combination of the various parts of the device whereby the objects contemplated are attained as hereinafter more fully set forth, pointed out in my claims, and illustrated in the accompanying drawings, in which—

Figure 1 shows a top or plan view of a valve gearing embodying my invention. Fig. 2 shows a side elevation of the same, and Fig. 3 shows a sectional view on the line 3—3 of Fig. 2.

Referring to the accompanying drawings, I have used the reference numeral 10 to indicate a stationary support to which the valve gearing is attached, 11 indicates the valve chamber and 12, the valve stem. The engine shaft is indicated by the numeral 13. Mounted upon the engine shaft is an eccentric 14 and arranged on the eccentric is an eccentric strap 15 having a connecting arm 16 fixed to it. Mounted on the support 10 is a shaft 17 having a bell-crank 18 mounted thereon. One arm of the bell-crank 18 extends downwardly and is pivoted to the valve stem 12, the other arm extends substantially horizontal and has a link 19 pivoted to it and also pivotally attached to the connecting arm 16. Pivotally mounted on the end of the connecting arm 16 is a segmental slide-block 20, which block is mounted in a segmental guide-way formed in the reverse block 21, said reverse block being formed with an opening 22 in the rear of the slide-block 20 for purposes hereinafter made clear. It is also provided with segmental slots 23 through which the pin 24 is extended. This pin is the one which is attached to the connecting arm 16. This reverse block is provided with an adjustable section 21ª at the top, said adjustment being provided for by the bolts 21ᵇ in the slots 21ᶜ. After wear has taken place the section 21ª may be moved toward the lower section. This will not affect the alinement of the valve gearing because the wear between the reverse block and the slide block will be approximately the same as that on the engine crank and eccentric.

I provide for pivotally supporting the reverse block 21 as follows: In the rear of the reverse block is a cylindrical extension 25 which is inserted in a cylindrical sleeve 26 fixed to the stationary support 10. The part 25 is detachably connected with the sleeve 26 by means of a collar 27 having a flange 28, the collar 27 being inserted in the cylindrical extension 25 and being held in position therein by the set screw 29, and the flange 28 being so arranged as to engage the sleeve 26 and prevent the reverse block from moving outwardly away from the support 10. In the drawings, I have shown one end of the connecting arm 16 to be forked and the inner portion of the fork is projected through the opening 22, so that the connecting arm is attached to both ends of the pin 24, and the valve stem 12 also extends through this opening 22. It is to be noted, as clearly shown in Fig. 3, that the center of the cylindrical extension 25 is in line with the pin 24 to which the connecting arm is pivoted.

On the lower end of the reverse block is an arm 30 and pivoted to this arm is a rod 31 connected to the lever 32, which lever is provided with a spring actuated pawl 33 designed to engage the sector 34.

In practical use motion is transmitted from the engine shaft 13 to the valve stem 12 as follows: The eccentric 14 and eccentric strap 15 give to the adjacent end of the connecting arm a circular movement, and the slide-block connected to the other end of the arm gives to said end more or less of an up and down movement in addition to its longitudinal movement dependent upon the position of the reverse block, hence, the central portion of the connecting arm will impart to the link 19 an up and down movement which will impart to the valve stem 12 a longitudinal movement, the length of which is controlled by the length of the up and down movement of the central portion of the connecting arm. Assuming that the movement of the slide-block is in a substantially horizontal plane, then obviously, the up and down movement of the central portion of the connecting arm will be at its minimum, and hence, the valve stem will be given a short stroke. The length of stroke of the valve stem will be increased in proportion as the reverse block is moved to position for causing the slide-block to move up and down, hence, when the reverse block is moved to position with the slide-block tilted upwardly to its circuit of movement, the valve stem will be given its maximum stroke.

I arrange the parts so that when the arm 30 is in a vertical position, the valve stem will be given a movement so short that the engine will not operate and the length of the valve stroke will be increased as the arm 30 is moved toward either side of its vertical position. When moved to one side the engine will run in one direction and when moved to the other side, the engine will run in the reverse direction. Obviously, by this arrangement the valve stem will be given exactly the same length of stroke if the arm 30 is moved to position at an angle say of twenty-five degrees from a vertical line on one side as it will if the arm 30 is moved to a corresponding angle on the other side, hence, the valve will have exactly the same lead relative to the piston when the engine is running in either direction. By this means the engine will operate at its maximum efficiency regardless of the period of cut off to which the valve is set.

The advantage that is gained by having the connecting arm pivoted to the slide block at a point in line with the pivotal center of the reverse block, or in other words at a point in line with the longitudinal center of the guideway in the reverse block, when the slide block is at its center of movement, is as follows: When the connecting arm is reciprocating and the valve rod is being moved by it, the valve offers considerable opposition to the movement of the valve rod and the parts that connect it with the connecting arm. If therefore the reverse block is pivoted above or below the center of the slide block the dragging of the valve will tend to tilt the reverse block and thus cause it to vibrate with the movements of the connecting rod, thus requiring the operator to hold the lever 32 very firmly or to latch it to the quadrant. However, in my device by pivoting the reverse block as stated, there is no appreciable tendency to tilt the reverse block by the dragging of the valve and hence the operator may place the lever 32 in the desired position and it will there remain, even though not latched to the quadrant.

Another important structural advantage of my invention is that the cylindrical support 25 and 26 for the reverse block is made of comparatively large diameter, the diameter preferably being as great or greater than the length of the slide-block stroke. This is illustrated in Fig. 2 by showing the slot in the reverse block through which the pin 24 travels, and also showing the diameter of the support for the reverse block by dotted lines. The advantage of this construction is that by having the center of the slide-block at all times within the bearing of the reverse block, all twisting strains upon the reverse block will be reduced to a minimum as applied to the support for the reverse block because all of the strains thus applied will fall inside of the circular bearing for the reverse block.

I claim as my invention.

1. In a device of the class described, an engine shaft, a connecting arm, means for imparting a rotary movement to one end of the connecting arm by said engine shaft, a slide block pivoted to the other end of the arm, a reverse block pivotally supported and provided with a segmental guideway, said guideway, being substantially horizontal when the reverse block is at the center of its movement, the central point of which guideway is in line with the pivotal center of the reverse block, means for tilting the reverse block, a valve rod, and means operated by said connecting arm for actuating the valve rod.

2. In a device of the class described, the combination of an engine shaft, an eccentric thereon, an eccentric strap on the eccentric, a connecting arm fixed to the eccentric strap, a valve stem, a reverse block pivotally supported and having a passage-way extended through it, and a guide-way formed therein, a slide-block mounted in the guide-way, a pin extended through the slide-block, said connecting arm having a forked end, said forked end being attached to said pin on opposite sides of the slide-block, said valve stem being also extended through the passage-way of the reverse block, a bell crank, a link pivoted to one end thereof and to the connecting arm, the other end of the bell crank being attached to the valve stem.

3. In a device of the class described, the combination of an engine shaft, an eccentric thereon, an eccentric strap on the eccentric, a connecting arm fixed to the eccentric strap, a stationary support, a cylindrical bearing on the stationary support, a cylindrical journal within the bearing, means for detachably securing the cylindrical journal to the cylindrical bearing, a plate carried by the cylindrical journal, a second plate bolted to it and formed with a segmental guide-way, said plates being provided with segmental slots, an arm projecting downwardly from the latter plate, a slide-block in said guide-way having the connecting arm pivoted to it, said cylindrical bearing being of a diameter at least as great as the length of stroke of the slide-block, means attached to said arm for adjusting it to various positions, a bell crank lever, a link pivoted to one end of the bell crank lever and to the connecting arm, and a valve stem connected to the other end of the lever.

4. In a device of the class described, the combination with an engine shaft and a valve stem, of an eccentric on the engine shaft, an eccentric strap on the eccentric, a connecting arm attached thereto, a pivotally supported reverse block, a slide-block mounted on the reverse block and having said connecting arm attached thereto, a link pivoted to the connecting arm, a bell-crank lever having said link pivoted to it, the other end of the bell crank lever being connected to the valve stem, and means for adjusting the upper portion of the reverse block relative to the lower portion to take up wear between the reverse block and the slide block.

5. In a device of the class described, an engine shaft, a connecting arm, means for imparting a rotary movement to one end of said connecting arm by said engine shaft, a block pivoted to the other end of the arm, a reverse block pivotally supported and having said block on the connecting arm mounted in it, the block on the connecting arm being guided by the reverse block to move in the arc of a circle, and said reverse block being pivoted on a center in line with the center of said arc, a link connected to the connecting rod, a lever connected to the link, a valve rod connected to the lever and means for tilting the reverse block.

6. In a device of the class described, the combination of a valve chamber, a valve rod, an engine shaft, a reverse block pivotally supported between the valve chamber and the engine shaft, an eccentric on the engine shaft, a connecting arm operated by the eccentric, a block in the reverse block pivoted to the connecting arm and capable of being moved in the arc of a circle by the rotary movement of the other end of the connecting arm and being guided in said movement by the reverse block, said reverse block being pivotally supported at a point in line with the center of the arc in which said block on the connecting rod moves, a link extended upwardly from the connecting rod and pivoted between the ends thereof, a bell crank lever attached at one end to said link and at its other end to said valve stem, and means for adjusting the reverse block.

Des Moines, Iowa, June 23, 1908.

FRANZ J. WOOD.

Witnesses:
N. M. TAYLOR,
M. B. GOLDIZEN.

Copies of this patent may be obtained for five cents each, by addressing the "Commissioner of Patents, Washington, D. C."